CABINET CHASSIS VERTICAL MOUNT

Filed Nov. 16, 1959 2 Sheets-Sheet 1

INVENTOR
HERBERT S. FALL
BY Herbert A. Minturn
ATTORNEY

June 6, 1961 H. S. FALL 2,987,364

CABINET CHASSIS VERTICAL MOUNT

Filed Nov. 16, 1959 2 Sheets-Sheet 2

INVENTOR
HERBERT S. FALL
BY Herbert A. Minturn
ATTORNEY 2,987,364
CABINET CHASSIS VERTICAL MOUNT
Herbert S. Fall, Indianapolis, Ind.
Filed Nov. 16, 1959, Ser. No. 853,158
1 Claim. (Cl. 312—335)

This invention relates to the mounting of an electronic assembly carried by a chassis which is carried as a unit within a cabinet to be readily pulled outwardly therefrom and returned therein. Normally cabinet storage space is at a premium in that in most installations, there are so many of the chassis units that they must be stored in compact relation one with another and yet at the same time be readily available for inspection and repair from both sides of the chassis.

A primary object of the invention resides in the fact that the structure embodying the invention permits accessibility to both sides of the chassis, the chassis being mounted in a vertical plane contrary to the normal mounting horizontally. Further important objects of the invention are, the provision of a very rigid support although the support for the chassis is extensible from the cabinet and retractable therewithin, and the chassis is releasable.

A further important advantage of the invention is that there is an automatic extension latch release permitting the chassis to be pushed back into the cabinet without having to release manually any engaging fingers or like members. There is a prealigned track carrying the chassis mounted in a frame to be readily removable from that frame, and yet affording a rigid construction preventing side sway, the rigidity being sufficient to permit work on the chassis without causing it to deviate from its normal vertical relation.

All of these advantages and objects are had within an extremely narrow cabinet space. These and many other objects and advantages of the invention will become apparent to those versed in the art in the following description of one particular form which is made in reference to the accompanying drawings, in which FIG. 1 is a view in front perspective with a chassis carrier withdrawn;

FIGS. 5–7 are shown in an enlarged scale as compared to that employed in FIGS. 3 and 4.

Figures 1, 2, 8:
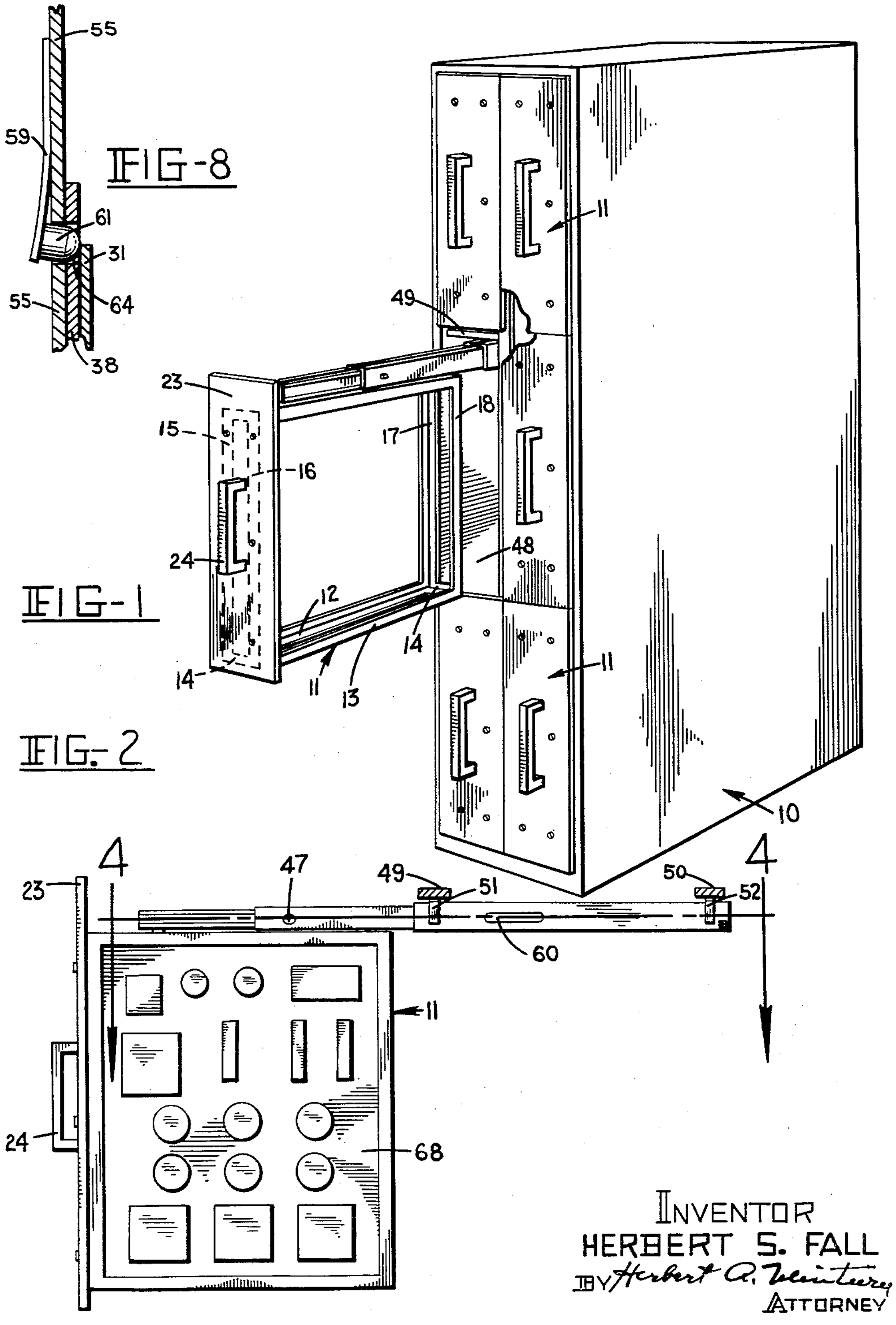
FIG. 2 is a view in detail in side elevation and partial section of a chassis carrier.
FIG. 8 is a detail in horizontal section of a track latch.

A cabinet, preferably made out of metal, designated by the numeral 10, is constructed to receive a plurality of chassis carriers generally designated by the numeral 11. The carrier 11 in each instance is quite narrow in width horizontally as compared to the vertical dimension.

Each carrier 11 is constructed in the present form from angle irons employed to make parallel lower rails 12 and 13 tied together at front and rear ends by cross bars 14. Pairs of front and rear angle bars 15, 16, and 17, 18 are joined to the respective front and rear ends of the lower rails 12 and 13, at the ends of the bars 14. The upper ends of these pairs of angle bars 15, 16, and 17, 18 are joined with top horizontally disposed angle bars 19 and 20, each spaced at their respective front and rear ends by a short bar 21 and 22. Preferably all of these angle iron members are welded one to the other to form the rectilinear framework. Across the front end of the carrier 11 is mounted a cover plate, herein shown as a rectangular member 23. This member 23 may be made out of metal, but preferably out of a transparent plastic material to give some visibility from the outside of the carrier 11 to the inside chassis which is mounted in the carrier. Preferably a pull handle 24 is fixed to the front plate 23. The frame 11 is rigidly attached to members of a track system.

Figure 3:
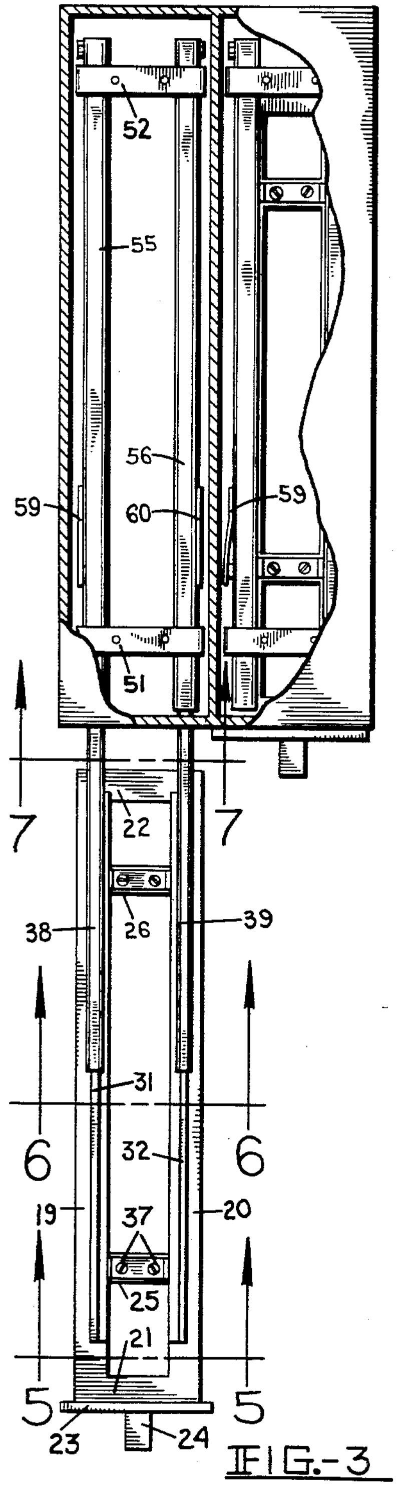
FIG. 3 is a detail in top plan and partial section of the structure embodying the invention.
Figure 6:
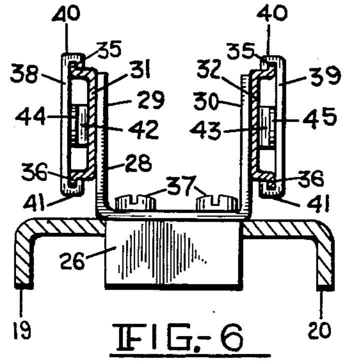
FIG. 6 is a vertical section on the line 6—6 in Fig. 3.
Figure 5:
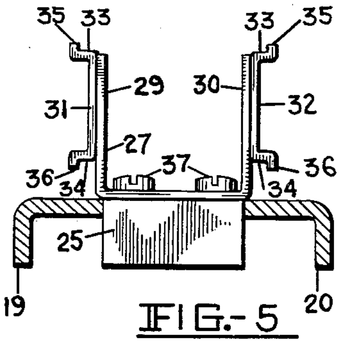
FIG. 5 is a view in vertical section on the line 5—5 in FIG. 3.

In this track system, there are cross bars (angle bars) 25 and 26 interconnecting the top bars 19 and 20 of the frame 11, FIGS. 3, 5 and 6. These cross bars 25 and 26 are spaced intermediate the cross bars 21 and 22 and are spaced one from another.

A U-shaped bracket 27 and 28 respectively is fixed to the bars 25 and 26 to have their legs extend upwardly. Across the outsides of these legs identified by the numerals 29 and 30 in each instance, there is fixed a track section 31 and 32, herein designated for the purpose of description as being frame carried track sections.

Each of these track sections 31, 32 is identical one with the other, although reversely positioned on the legs 29 and 30 to have extending therefrom short parallel flanges 33 and 34 with vertically disposed lips 35 upwardly extending from outer portions of the flanges 33 and lips 36 downwardly extending from the outer portions of the flanges 34. These two track sections 31 and 32 are rigidly attached to the legs 29 and 30 to become in effect integral parts thereof such as is had through welding. The brackets 27 and 28 may be detachably secured to their respective bars 25 and 26 by any suitable means such as by the screws 37.

A pair of intermediate track sections 38 and 39 telescope over the track sections 31 and 32 respectively by means of C-shaped flanges 40 and 41 engaging around the upper and lower lips 35 and 36 respectively, FIG. 6. There is a sliding fit between the lips 35 and 36 inside the flanges 40 and 41 so that the frame track sections 31 and 32 may be withdrawn freely from and along the intermediate track sections 38 and 39.

A pair of spring tongues 42 and 43 is fixed respectively to the outer sides of the track sections 31 and 32 intermediate the upper and lower flanges 33 and 34. That is, end portions of those tongues 42 and 43 are fixed to the sections 31 and 32 to extend therealong and to be bowed outwardly and away from those track sections toward the inside faces of the intermediate track sections 38 and 39, the free ends of the tongues 42 and 43 being directed toward the outer ends of the sections 31 and 32 which extend toward the plate 23. A button 44 and 45 is respectively fixed to the outer free ends of the tongues 42 and 43 to bear against the inside faces of the intermediate track sections 38 and 39. Toward the outer end portions of these track sections 38 and 39, there are holes 46 and 47 into which the buttons 44 and 45 may drop and stop travel of the frame track sections 31 and 32 after an initial extension therefrom. There is however a sufficient length in each instance of the frame track sections 31 and 32 remaining within the engagements of the intermediate track sections 38 and 39 to form a rigid carrying between those two sets of track sections of the frame 11. The faces of these buttons 44 and 45 are beveled from outer ends back inwardly toward the outer sides of the tongues 42 and 43 so that when the frame sections 31 and 32 have pressure put on them to return them to within the intermediate track sections 38 and 39, the buttons 44 and 45 will be cammed from their holes 46 and 47. In this manner, the track sections 31 and 32 may be automatically carried in respect to latching and unlatching operations back within the confines of the intermediate track sections 38 and 39.

The cabinet 10 has an opening 48 for each of the several frames 11. As indicated in FIG. 1, the central vertically disposed frame 11 has been pulled outwardly from the cabinet 10, exposing the opening into the hole or space 48 within which the frame 11 is normally stored.

Within the cabinet 10, in the upper side of the space 48, there are positioned crosswise thereof a pair of mounting bars 49 and 50, FIGS. 1 and 2, on the undersides of which are fixed a pair of downwardly directed mounting brackets 51 and 52. These mounting brackets 51 and 52 are inverted U-shaped, and are preferably detachably secured to the cross bars 49 and 50 by any suitable means.

Each bracket 51 and 52, to define the inverted U-shape has spaced apart downturned legs 53 and 54. A rear track section 55 and 56 is secured with outer faces bearing against the inside opposing faces of the legs 53 and 54. Preferably this securing is done by spot welding. Each of these track sections 55 and 56 has, in cross section, an elongated, vertically disposed C section. The upper and lower ends of the sections 55 and 56 carry between their top and bottom flanges 57 and 58 the flanges 40 and 41 of the intermediate track sections 38 and 39. These intermediate sections 38 and 39 have a sliding fit between the flanges 57 and 58, the flanges 57 and 58 being rounded around the flanges 40 and 41 so as to slidingly retain the intermediate track sections 38 and 39 against displacement laterally and vertically. The intermediate track sections 38 and 39 are free to travel longitudinally in guided relation along the rear sections 55 and 56.

Figure 4:
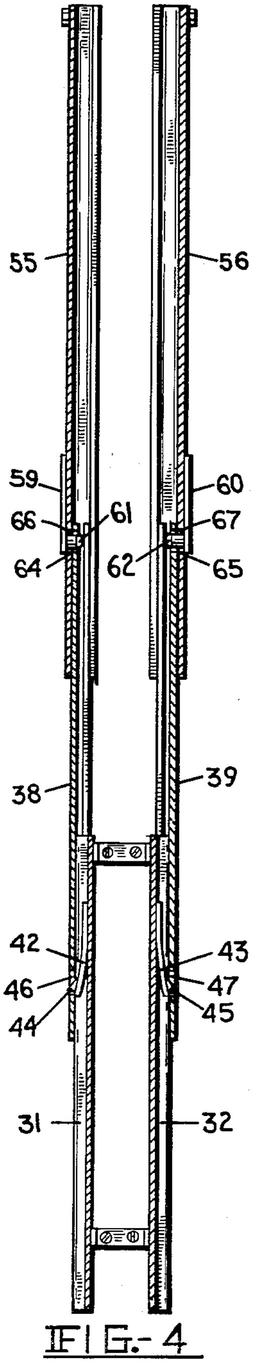
FIG. 4 is a view in longitudinal section on the line 4—4 in FIG. 2.
Figure 7:
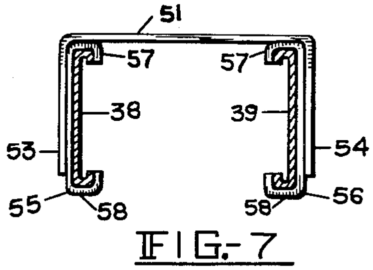
FIG. 7 is a vertical section on the line 7—7 in FIG. 3.

The travel of the intermediate sections 38 and 39 along the rear sections 55 and 56 is limited in forward travel. This forward travel limitation consists of a pair of spring tongues 59 and 60 respectively fixed by the rear ends to the outer sides of the back track sections 55 and 56, toward their forward ends, FIG. 4. These tongues 59 and 60 extend freely along and normally in contact with the outer faces of the rear track sections 55 and 56. Each tongue 59 and 60 carries a rounded nosed button 61 and 62 respectively which are in the paths of holes 64 and 65 through the rear end portions of the intermediate track sections 38 and 39, the buttons 61 and 62 passing through holes 66 and 67, freely, through the side faces of the stationary track sections 55 and 56. By reason of the rounded noses, the buttons 61 and 62 are free to drop into the intermediate track section holes 64 and 65, and then when the track sections 31 and 32 are moved inwardly along the intermediate sections 38 and 39, the inner ends of the sections 31 and 32 will come into contact with the buttons 61 and 62, that is the rounded protruding noses thereof, to push those buttons 61 and 62 outwardly sufficient so that when the intermediate sections 38 and 39 start moving rearwardly, the rounded sections only will be within the holes 64 and 65, thereby permitting the intermediate sections 38 and 39, to cam those pins 61 and 62 outwardly to release the sections 38 and 39 and permit their telescoping completely within the back track sections 55 and 56. In this manner, while the pins 61 and 62 form positive stops for outward travel of the sections 38 and 39, they are automatically released upon return travel of the front sections 31 and 32 followed by travel of the intermediate sections 38 and 39. The pins 61 and 62 have a cylindrical length approximately equal to the combined thicknesses of the track sections 55 and 38, and the rounded nose end projects beyond that cylindrical length.

Within the confines of the frame 11, a chassis 68 may be mounted as indicated in FIG. 2. This chassis 68 is thus provided with the frame carrying means, whereby the frame 11 will carry the chassis 68 back within the cabinet 10 when the front cover plate 23 comes back to form the closure for the space 48. The chassis 68 is accessible from either side thereof when the frame 11 is pulled to its outermost position as indicated in FIG. 1, and by reason of the mounting of the two tracks in the track system, one identical track with the other, there is no side sway in the frame 11 when it is pulled out nor when it is being returned to within the cabinet. Neither is there any vertical travel beyond that permitted in the sliding fit between the track sections, these fits being close.

Therefore it is to be seen that I have presented an extremely simple, yet most effective and serviceable structure for the purposes indicated, occupying the minimum permissible spacing of carrying frame within a cabinet. Therefore while I have described the one particular form of the invention herein shown in minute detail, it is obvious that structural changes may be provided without departing from the spirit of the invention. For example, the rectilinear framework composed of bars 15, 16; 17, 18; 19, 20; and lower rails 12, 13 may be incorporated in the chassis itself with side or end plates being available for servicing to the brackets 51 and 52. I therefore do not desire to be limited to that particular form beyond the limitations which may be imposed by the following claim.

I claim:

A construction mounting a chassis by an edge portion thereof in a cabinet with the general plane of the chassis extending vertically downwardly from the mounting edge portion, which construction comprises a pair of spaced apart, vertically elongated C-section track lengths with opposing top and bottom channels and fixed within and to extend longitudinally, horizontally toward an open side of the cabinet; a pair of intermediate tracks in the nature of vertically disposed plates of C-section and each having a top and bottom edge portion slidingly engaged within said fixed track length channels constraining the plate of the intermediate tracks in approximately sliding contact with the plate of the fixed track; said intermediate track edge portions defining opposing channels, and having a hole through the rear end of the track plate portion of at least one of the intermediate tracks; spring latch means carried exteriorly of a fixed track; said fixed track having a hole therethrough adjacent its cabinet opening end; said latch means having a member urged to enter said hole and be urged against the plate of the intermediate track member in the path of said intermediate track member hole, dropping into the intermediate track hole upon a predetermined limit of outward travel of the intermediate track welded to the fixed track, said latch member having a laterally outwardly sloping face whereby reverse travel of the intermediate track cams the latch member out of the intermediate track hole; a third pair of tracks, each comprising a vertically disposed plate with offset top and bottom edge portions slidingly received in the top and bottom channels of said intermediate track channels and spacing apart the plates of the intermediate and third tracks; spring latch means carried within at least one of said spacings and fixed to said third track plate; said intermediate track plate having a hole therethrough adjacent its outer end; said last spring means carrying a button spring urged against the intermediate track plate in the path of the third plate hole to drop therein to limit outward travel of the third tracks; a plurality of U brackets spacing apart and rigidly fixed to the opposing plates of said third tracks; and a chassis support member rigidly attached to the webs of said bracket suspending the chassis therefrom and therebelow, holding the chassis against side sway.

References Cited in the file of this patent

UNITED STATES PATENTS

| | | |
|---|---|---|
| 1,259,345 | Beecham | Mar. 12, 1918 |
| 1,684,889 | Russ | Sept. 18, 1928 |
| 1,750,291 | Whetstone | Mar. 11, 1930 |
| 2,809,085 | Fall | Oct. 8, 1957 |

FOREIGN PATENTS

| | | |
|---|---|---|
| 94,401 | Switzerland | May 1, 1922 |
| 276,354 | Italy | July 22, 1930 |